US011681597B2

(12) United States Patent
Hu et al.

(10) Patent No.: US 11,681,597 B2
(45) Date of Patent: Jun. 20, 2023

(54) ANOMALY DETECTION METHOD AND SYSTEM FOR PROCESS INSTRUMENT, AND STORAGE MEDIUM

(71) Applicant: Siemens Aktiengesellschaft, Munich (DE)

(72) Inventors: Xi Hu, Beijing (CN); Ji Li, Beijing (CN); Qinggang Wang, Beijing (CN); Yue Zhuo, Beijing (CN)

(73) Assignee: Siemens Aktiengesellschaft, Munich (DE)

( * ) Notice: Subject to any disclaimer, the term of this patent is extended or adjusted under 35 U.S.C. 154(b) by 26 days.

(21) Appl. No.: 16/957,744

(22) PCT Filed: Dec. 29, 2017

(86) PCT No.: PCT/CN2017/120227
§ 371 (c)(1),
(2) Date: Jun. 25, 2020

(87) PCT Pub. No.: WO2019/127501
PCT Pub. Date: Jul. 4, 2019

(65) Prior Publication Data
US 2020/0349044 A1 Nov. 5, 2020

(51) Int. Cl.
*G06F 11/30* (2006.01)
*G05B 19/05* (2006.01)
(Continued)

(52) U.S. Cl.
CPC .......... *G06F 11/3013* (2013.01); *G05B 19/05* (2013.01); *G05B 19/058* (2013.01);
(Continued)

(58) Field of Classification Search
None
See application file for complete search history.

(56) References Cited

U.S. PATENT DOCUMENTS 7,151,966 B1  12/2006  Baier et al.
9,965,562 B2   5/2018  Lawson et al.
(Continued)

FOREIGN PATENT DOCUMENTS

CN    1710862 A    12/2005
CN  101388101 A     3/2009
(Continued)

OTHER PUBLICATIONS

Ghosh et al., "FBMTP: An Automated Fault and Behavioral Anomaly Detection and Isolation Tool for PLC-Controlled Manufacturing Systems", Dec. 2016, IEEE Transactions on Systems, Man, and Cybernetics: Systems vol. 47 No. 12, pp. 3399-3416 (Year: 2016).*

(Continued)

*Primary Examiner* — Mohammad Ali
*Assistant Examiner* — David Earl Ogg
(74) *Attorney, Agent, or Firm* — Harness, Dickey & Pierce, P.L.C.

(57) ABSTRACT

An anomaly detection method and system for a process instrument, and a storage medium are disclosed. The method includes that: a programmable logic controller (PLC) receives measurement data of a process instrument, the measurement data being periodically stored into a historical database so that a service providing system can perform reading and evaluation. At least one virtual function module is integrated on the PLC, a mapping relation is formed between at least one input channel of each virtual function module and output of at least one anomaly diagnosis algorithm disposed on the service providing system, and each anomaly diagnosis algorithm is used for diagnosing whether an anomaly exists in the process instrument. When an anomaly indication outputted by the service providing system is received via an input channel of the virtual function (Continued)

module, the PLC determines that an anomaly exists in the corresponding process instrument.

5 Claims, 4 Drawing Sheets

(51) Int. Cl.
    *G06F 11/07*     (2006.01)
    *G05B 23/02*     (2006.01)

(52) U.S. Cl.
    CPC ........ *G06F 11/079* (2013.01); *G06F 11/3072* (2013.01); *G06F 11/3089* (2013.01); *G05B 23/0289* (2013.01)

(56) References Cited

U.S. PATENT DOCUMENTS

| | | |
|---|---|---|
| 10,845,786 B2 | 11/2020 | Chauvet et al. |
| 2003/0061311 A1 | 3/2003 | Lo |
| 2007/0061455 A1 | 3/2007 | Callaghan |
| 2008/0189636 A1 | 8/2008 | Hood et al. |
| 2010/0235614 A1 | 9/2010 | Callaghan et al. |
| 2014/0088927 A1 | 3/2014 | Cao et al. |
| 2014/0244823 A1 | 8/2014 | Cornett et al. |
| 2014/0277605 A1 | 9/2014 | Nixon et al. |
| 2015/0007713 A1* | 1/2015 | Aki .................... F15B 15/2815 91/1 |
| 2015/0073751 A1 | 3/2015 | Liao et al. |
| 2016/0197778 A1 | 7/2016 | Jones et al. |
| 2016/0274552 A1 | 9/2016 | Strohmenger et al. |
| 2016/0323143 A1 | 11/2016 | Kim et al. |
| 2017/0103137 A1 | 4/2017 | Lawson et al. |
| 2017/0192871 A1* | 7/2017 | Hara .................... G06F 11/3485 |
| 2018/0299873 A1 | 10/2018 | Chauvet et al. |
| 2019/0294137 A1* | 9/2019 | Kawanoue ......... G05B 23/0254 |
| 2019/0302707 A1* | 10/2019 | Guo .................... G06N 3/049 |

FOREIGN PATENT DOCUMENTS

| | | |
|---|---|---|
| CN | 103676937 A * | 3/2014 |
| CN | 104049593 A | 9/2014 |
| CN | 104350435 A | 2/2015 |
| CN | 10456368 | 9/2015 |
| CN | 104903798 A | 9/2015 |
| CN | 104965481 | 10/2015 |
| CN | 105223901 | 1/2016 |
| CN | 105612466 A | 5/2016 |
| CN | 107357243 | 11/2017 |
| GB | 2513456 A | 10/2014 |
| JP | 2005243008 | 9/2005 |
| TW | I438593 | 5/2014 |
| WO | WO-2017/064560 A1 | 4/2017 |

OTHER PUBLICATIONS

Extended European Search Report dated Jun. 7, 2021.
International Search Report PCT/ISA/210 for International Application No. PCT/US2017/04002 filed Sep. 28, 2017.
Extended European Search Report dated Feb. 17, 2021.
International Search Report dated Sep. 25, 2018.
U.S. Office Action for U.S. Appl. No. 16/649,842 dated Oct. 29, 2021.
U.S. Appl. No. 16/649,842, filed Mar. 23, 2020.

\* cited by examiner

ANOMALY DETECTION METHOD AND SYSTEM FOR PROCESS INSTRUMENT, AND STORAGE MEDIUM

PRIORITY STATEMENT

This application is the national phase under 35 U.S.C. § 371 of PCT International Application No. PCT/CN2017/120227 which has an International filing date of Dec. 29, 2017, which designated the United States of America, the entire contents of which are hereby incorporated herein by reference.

FIELD

Embodiments of the present application relate to the field of process control, in particular to an anomaly detection method, apparatus and system for a process instrument, and a storage medium.

BACKGROUND

A process instrument is generally an instrument used to measure, monitor or check on-site signals such as temperature, pressure, flow rate, liquid level or valve positioning in an industrial (e.g. chemical industrial) process on a mass production operating line. Examples of process instruments include temperature sensors, pressure sensors, liquid level meters and flow meters, etc.

Process instruments generally always have certain basic self-diagnostic abilities for identifying abnormal operating situations, e.g. high electronic temperature, power supply voltage loss, etc. However, process instruments cannot diagnose certain other anomalies, such as pressure sensor pulse line blockage, sensor drift, and measurement errors caused by gas being entrained in process fluid; thus, measurement values of the process instruments will no longer be able accurately reflect process changes, and the abnormal measurement results outputted will affect future analysis results when used as historical data.

For the diagnosis of these anomalies, various anomaly diagnosis algorithms for process instruments are already in existence, e.g. statistical analysis, expert systems, etc. However, most anomaly diagnosis algorithms are data intensive and/or computationally intensive algorithms, and are difficult to use in low-power or low-cost process control apparatuses having limited resources; thus, at present, these anomaly diagnosis algorithms are generally used as independent applications.

SUMMARY

In view of this, embodiments of the present application propose an anomaly detection method for a process instrument, and also propose an anomaly detection apparatus and system for a process instrument, and a storage medium, for the purpose of enhancing the functionality of a programmable logic controller (PLC), to realize anomaly diagnosis for process instruments.

An anomaly detection method for a process instrument proposed in an embodiment of the present invention comprises: integrating at least one virtual function module on a programmable logic controller PLC, and for each virtual function module, establishing a mapping between at least one input channel of the virtual function module and an output of at least one anomaly diagnosis algorithm arranged on a service provision system, each anomaly diagnosis algorithm being used to diagnose whether an anomaly exists in a process instrument; a PLC receiving measurement data of a process instrument, the measurement data being periodically stored in a historical database, and wherein at least one virtual function module is integrated on the programmable logic controller PLC, wherein a mapping is set between at least one input channel of each virtual function module and an output of at least one anomaly diagnosis algorithm arranged on a service provision system, each anomaly diagnosis algorithm being used to diagnose whether an anomaly exists in a process instrument; upon receiving, via an input channel of the virtual function module, an anomaly indication outputted by the service provision system, the PLC determines that an anomaly exists in the process instrument corresponding to the anomaly diagnosis algorithm mapped to the input channel, wherein the anomaly indication is an indication outputted when the service provision system determines that an anomaly has occurred in the process instrument after acquiring the measurement data from the historical database and using the corresponding anomaly diagnosis algorithm to diagnose the measurement data.

Another anomaly detection method for a process instrument proposed in an embodiment of the present invention comprises: the service provision system acquiring measurement data of a process instrument from a historical database; the measurement data being measurement data which is received by the PLC from the process instrument and periodically stored in the historical database; wherein at least one anomaly diagnosis algorithm is arranged on the service provision system (130), and a mapping is set between an output of the at least one anomaly diagnosis algorithm and at least one input channel of at least one virtual function module (111) integrated on the programmable logic controller PLC (110); the service provision system using the corresponding anomaly diagnosis algorithm to diagnose the measurement data, and upon diagnosing that an anomaly has occurred in the process instrument, outputting an anomaly indication to the corresponding input channel of the virtual function module mapped to the anomaly diagnosis algorithm.

The anomaly detection apparatus for a process instrument proposed in an embodiment of the present invention may be a PLC and a service provision system.

The PLC may comprise a virtual function module, an analog quantity input/output module, a central processor module, a function module and a power supply module, wherein a mapping is set between at least one input channel of the virtual function module and an output of at least one anomaly diagnosis algorithm arranged on a service provision system, and when an input channel receives an anomaly indication outputted by the service provision system, the virtual function module provides the anomaly indication to the function module as an input variable of the function module; wherein the input variable is used to indicate that an anomaly exists in a process instrument corresponding to the anomaly diagnosis algorithm mapped to the input channel; the analog quantity input/output module receives measurement data of a process instrument, converts the measurement data from an analog quantity to a digital quantity and then provides same to the function module; and receives a first control instruction or second control instruction from the function module, converts the first control instruction or second control instruction from a digital quantity to an analog quantity and then outputs same to a process execution mechanism; the central processor module caches and transfers the measurement data; the function module, upon receiving the input variable, determines that an anomaly exists in the corresponding process instrument, and outputs a first control instruction to the analog quantity input/output module according to a preset default value; and otherwise outputs a second control instruction to the analog quantity input/output module according to the measurement data; the power supply module supplies power to the central processor module, the analog quantity input/output module and the function module.

The service provision system of an embodiment may comprise an algorithm module, a first communication module, a data processing module and a second communication module; wherein the algorithm module comprises at least one anomaly diagnosis algorithm, each anomaly diagnosis algorithm being used to diagnose whether an anomaly exists in a process instrument; a mapping is established between an output of the at least one anomaly diagnosis algorithm and at least one input channel of at least one virtual function module integrated on a programmable logic controller PLC; the first communication module acquires measurement data of a process instrument from a historical database; the measurement data is measurement data which is received by the PLC from the process instrument and periodically collected in the historical database; the data processing module calls the corresponding anomaly diagnosis algorithm in the algorithm module to diagnose the measurement data, and outputs an anomaly indication to the second communication module upon diagnosing that an anomaly exists in the corresponding process instrument; the second communication module outputs the anomaly indication to the corresponding input channel of the virtual function module mapped to the anomaly diagnosis algorithm.

In one embodiment, the service provision system may also comprise: at least one memory and at least one processor, wherein: the at least one memory is configured to store a computer program; the at least one processor is configured to call the computer program stored in the at least one memory, and execute the anomaly detection method for a process instrument of an embodiment.

The computer-readable storage medium proposed in an embodiment of the present invention has a computer program stored thereon; the computer program is executable by a processor and realizes the anomaly detection method for a process instrument as described above.

BRIEF DESCRIPTION OF THE DRAWINGS

Other features, characteristics and advantages of the present invention will become more obvious through the following detailed description in conjunction with the drawings.

Figure 1:
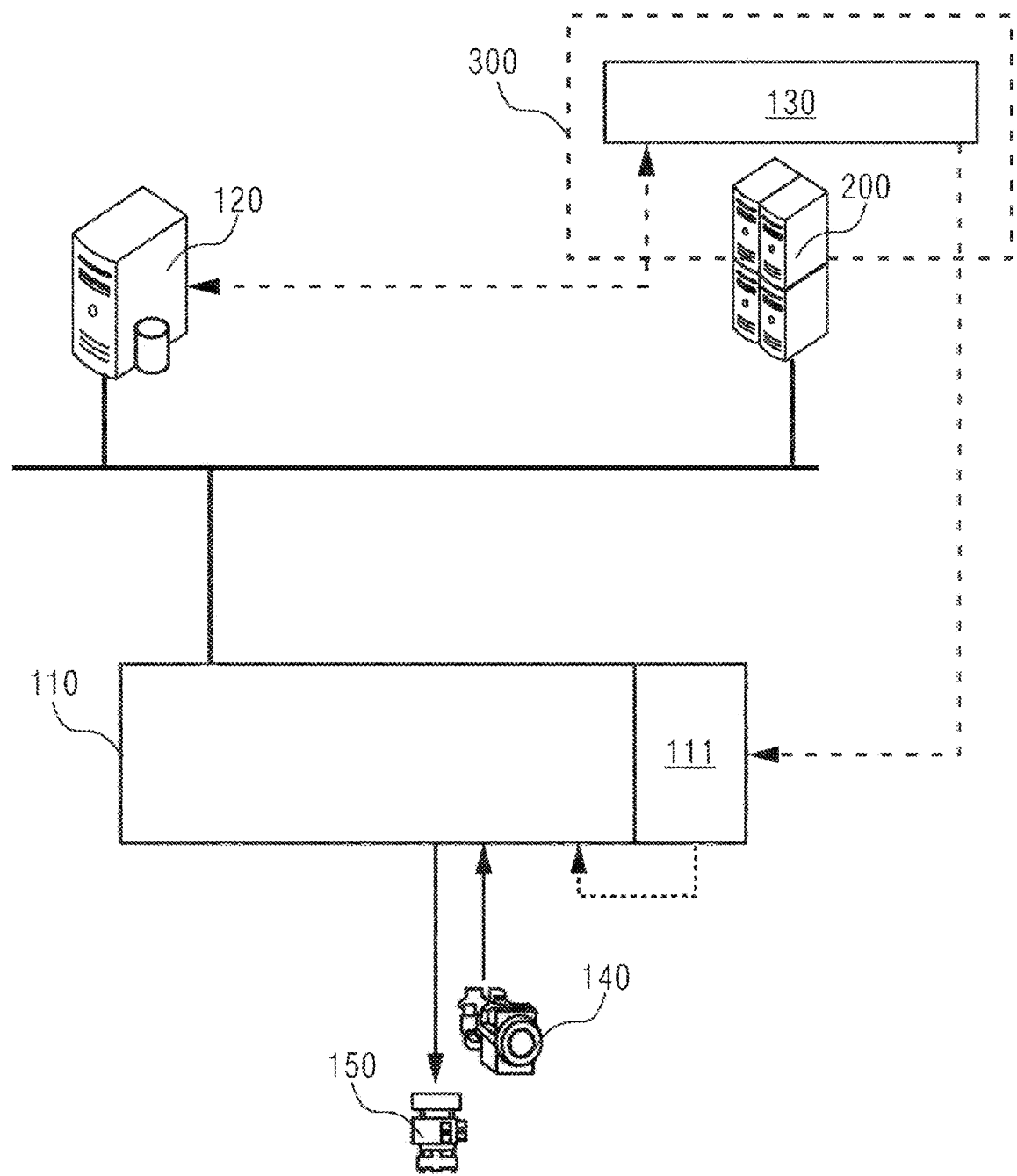
FIG. 1 is a structural schematic diagram of an application scenario of each embodiment of the present invention.

The reference labels used in the drawings are as follows:

| Label | Meaning |
| --- | --- |
| 110 | PLC |
| 111 | Virtual function module |
| 112 | Analog quantity input/output module |
| 113 | Central processor module |
| 114 | Function module |
| 115 | Power supply module |
| 120 | Historical database |
| 130 | Service provision system |
| 131 | Algorithm module |
| 132 | First communication module |
| 133 | Data processing module |
| 134 | Second communication module |
| 140 | Process instrument |
| 150 | Process execution mechanism |
| 200 | PC/server |
| 300 | Industrial cloud |
| 201-203, 401-404 | Steps |
| 701 | Memory |
| 702 | Processor |
| 703 | Port |
| 704 | Bus |

DETAILED DESCRIPTION OF THE EXAMPLE EMBODIMENTS

An anomaly detection method for a process instrument proposed in an embodiment of the present invention comprises: integrating at least one virtual function module on a programmable logic controller PLC, and for each virtual function module, establishing a mapping between at least one input channel of the virtual function module and an output of at least one anomaly diagnosis algorithm arranged on a service provision system, each anomaly diagnosis algorithm being used to diagnose whether an anomaly exists in a process instrument; a PLC receiving measurement data of a process instrument, the measurement data being periodically stored in a historical database, and wherein at least one virtual function module is integrated on the programmable logic controller PLC, wherein a mapping is set between at least one input channel of each virtual function module and an output of at least one anomaly diagnosis algorithm arranged on a service provision system, each anomaly diagnosis algorithm being used to diagnose whether an anomaly exists in a process instrument; upon receiving, via an input channel of the virtual function module, an anomaly indication outputted by the service provision system, the PLC determines that an anomaly exists in the process instrument corresponding to the anomaly diagnosis algorithm mapped to the input channel, wherein the anomaly indication is an indication outputted when the service provision system determines that an anomaly has occurred in the process instrument after acquiring the measurement data from the historical database and using the corresponding anomaly diagnosis algorithm to diagnose the measurement data.

As can be seen, in an embodiment of the present invention, due to the fact that a mapping is set between the output of each anomaly diagnosis algorithm arranged on a service provision system and each input channel of at least one virtual function module integrated on the PLC, each anomaly diagnosis algorithm may be disguised as an algorithm module of the PLC itself; thus, when each anomaly diagnosis algorithm on the service provision system is used to evaluate process instrument measurement data received by the PLC and determine that an anomaly has occurred in a particular process instrument, an anomaly indication will be outputted to the corresponding input channel of the PLC, and the anomaly indication participates in PLC control directly as an input parameter of the PLC, thereby enhancing the functionality of the PLC, and realizing anomaly diagnosis for the process instrument.

In one embodiment, the method further comprises: the PLC controlling a process execution mechanism according to the measurement data when the anomaly indication is not received; controlling the process execution mechanism according to a preset default datum when the anomaly indication is received. In this embodiment, when an anomaly indication occurs, this indicates that the measurement data of the process instrument received by the PLC directly is already inaccurate, and correspondingly, subsequent control performed using the measurement data will also be inaccurate; for this reason, by using a preset, relatively accurate default datum to replace the measurement data to perform subsequent control, it is possible to make PLC control more accurate, thereby improving PLC control accuracy.

Another anomaly detection method for a process instrument proposed in an embodiment of the present invention comprises: the service provision system acquiring measurement data of a process instrument from a historical database; the measurement data being measurement data which is received by the PLC from the process instrument and periodically stored in the historical database; wherein at least one anomaly diagnosis algorithm is arranged on the service provision system (130), and a mapping is set between an output of the at least one anomaly diagnosis algorithm and at least one input channel of at least one virtual function module (111) integrated on the programmable logic controller PLC (110); the service provision system using the corresponding anomaly diagnosis algorithm to diagnose the measurement data, and upon diagnosing that an anomaly has occurred in the process instrument, outputting an anomaly indication to the corresponding input channel of the virtual function module mapped to the anomaly diagnosis algorithm.

As can be seen, in an embodiment of the present invention, due to the fact that each anomaly diagnosis algorithm is arranged on a service provision system, while at least one virtual function module is integrated on the PLC, and a mapping is established between each input channel of each virtual function module and the output of each anomaly diagnosis algorithm arranged on the service provision system, each anomaly diagnosis algorithm may be disguised as an algorithm module of the PLC itself; thus, when each anomaly diagnosis algorithm on the service provision system is used to evaluate process instrument measurement data received by the PLC and determine that an anomaly has occurred in a particular process instrument, an anomaly indication will be outputted to the corresponding input channel of the PLC, and the anomaly indication participates in PLC control directly as an input parameter of the PLC, thereby enhancing the functionality of the PLC, and realizing anomaly diagnosis for the process instrument.

In one embodiment, the method further comprises: the service provision system replacing measurement data, corresponding to when an anomaly occurs in the process instrument, with a preset default datum; storing the default datum in the historical database instead of the measurement data corresponding to when an anomaly occurs in the process instrument. In this embodiment, by using a relatively accurate default datum to correct data in the historical database following the occurrence of an anomaly in a process instrument, it is possible to increase the accuracy of results when historical data is used to perform future analysis or statistical analysis.

The anomaly detection apparatus for a process instrument proposed in an embodiment of the present invention may be a PLC and a service provision system.

The PLC may comprise a virtual function module, an analog quantity input/output module, a central processor module, a function module and a power supply module, wherein a mapping is set between at least one input channel of the virtual function module and an output of at least one anomaly diagnosis algorithm arranged on a service provision system, and when an input channel receives an anomaly indication outputted by the service provision system, the virtual function module provides the anomaly indication to the function module as an input variable of the function module; wherein the input variable is used to indicate that an anomaly exists in a process instrument corresponding to the anomaly diagnosis algorithm mapped to the input channel; the analog quantity input/output module receives measurement data of a process instrument, converts the measurement data from an analog quantity to a digital quantity and then provides same to the function module; and receives a first control instruction or second control instruction from the function module, converts the first control instruction or second control instruction from a digital quantity to an analog quantity and then outputs same to a process execution mechanism; the central processor module caches and transfers the measurement data; the function module, upon receiving the input variable, determines that an anomaly exists in the corresponding process instrument, and outputs a first control instruction to the analog quantity input/output module according to a preset default value; and otherwise outputs a second control instruction to the analog quantity input/output module according to the measurement data; the power supply module supplies power to the central processor module, the analog quantity input/output module and the function module.

As can be seen, in an embodiment of the present invention, due to the fact that a mapping is set between the output of each anomaly diagnosis algorithm arranged on a service provision system and each input channel of at least one virtual function module integrated on the PLC, each anomaly diagnosis algorithm may be disguised as an algorithm module of the PLC itself; thus, when each anomaly diagnosis algorithm on the service provision system is used to evaluate process instrument measurement data received by the PLC and determine that an anomaly has occurred in a particular process instrument, an anomaly indication will be outputted to the corresponding input channel of the PLC, and the anomaly indication participates in PLC control directly as an input parameter of the PLC, thereby enhancing the functionality of the PLC, and realizing anomaly diagnosis for the process instrument. In addition, when it is diagnosed that an anomaly has occurred in a process instrument, by using a preset, relatively accurate default datum to replace the measurement data to perform subsequent control, it is possible to make PLC control more accurate, thereby improving PLC control accuracy.

The service provision system of an embodiment may comprise an algorithm module, a first communication module, a data processing module and a second communication module; wherein the algorithm module comprises at least one anomaly diagnosis algorithm, each anomaly diagnosis algorithm being used to diagnose whether an anomaly exists in a process instrument; a mapping is established between an output of the at least one anomaly diagnosis algorithm and at least one input channel of at least one virtual function module integrated on a programmable logic controller PLC; the first communication module acquires measurement data of a process instrument from a historical database; the measurement data is measurement data which is received by the PLC from the process instrument and periodically collected in the historical database; the data processing module calls the corresponding anomaly diagnosis algorithm in the algorithm module to diagnose the measurement data, and outputs an anomaly indication to the second communication module upon diagnosing that an anomaly exists in the corresponding process instrument; the second communication module outputs the anomaly indication to the corresponding input channel of the virtual function module mapped to the anomaly diagnosis algorithm.

As can be seen, in an embodiment of the present invention, due to the fact that a mapping is set between the output of each anomaly diagnosis algorithm arranged on a service provision system and each input channel of at least one virtual function module integrated on the PLC, each anomaly diagnosis algorithm may be disguised as an algorithm module of the PLC itself; thus, when each anomaly diagnosis algorithm on the service provision system is used to evaluate process instrument measurement data received by the PLC and determine that an anomaly has occurred in a particular process instrument, an anomaly indication will be outputted to the corresponding input channel of the PLC, and the anomaly indication participates in PLC control directly as an input parameter of the PLC, thereby enhancing the functionality of the PLC, and realizing anomaly diagnosis for the process instrument.

In one embodiment, the data processing module further replaces measurement data, corresponding to when an anomaly occurs in the process instrument, with a preset default datum; the first communication module further stores the default datum in the historical database instead of the measurement data corresponding to when an anomaly occurs in the process instrument. In this embodiment, by using a relatively accurate default datum to correct data in the historical database following the occurrence of an anomaly in a process instrument, it is possible to increase the accuracy of results when historical data is used to perform future analysis or statistical analysis.

In one embodiment, the service provision system is arranged on a PC, a server, or an industrial cloud. As can be seen, the service provision system can be flexibly arranged on a third party resource other than the PLC; in particular, as cloud technology develops, the efficiency of a service provision system arranged on a cloud resource is increased.

In one embodiment, the service provision system may also comprise: at least one memory and at least one processor, wherein: the at least one memory is configured to store a computer program; the at least one processor is configured to call the computer program stored in the at least one memory, and execute the anomaly detection method for a process instrument of an embodiment.

The anomaly diagnosis system for a process instrument proposed in an embodiment of the present invention may comprise the abovementioned PLC, service provision system and historical database; wherein the historical database is configured to store measurement data of at least one process instrument collected periodically from the PLC.

The computer-readable storage medium proposed in an embodiment of the present invention has a computer program stored thereon; the computer program is executable by a processor and realizes the anomaly detection method for a process instrument as described above.

In an embodiment of the present invention, in view of the fact that at present, many industrial control apparatuses are realized using a PLC, and existing anomaly diagnosis algorithms cannot be used in the PLC directly, each anomaly diagnosis algorithm is arranged on a service provision system such as a PC, server or industrial cloud; at the same time, at least one virtual function module is integrated on the PLC, and a mapping is established between each input channel of each virtual function module and an output of each anomaly diagnosis algorithm arranged on the service provision system. Thus, measurement data of each process instrument received by the PLC can be subjected to evaluation diagnosis using the corresponding anomaly diagnosis algorithm on the service provision system; subsequently, when an anomaly is detected in a particular process instrument, an anomaly indication is outputted to the corresponding input channel of the corresponding virtual function module, such that the anomaly indication can directly participate in a control process of the PLC as an input parameter of the control process of the PLC.

To clarify the object, technical solution and advantages of the present invention, the present invention is explained in further detail below, citing embodiments.

FIG. 1 is a structural schematic diagram of an application scenario of each embodiment of the present invention. As shown in FIG. 1, the application scenario comprises a PLC 110, a historical database 120 and a service provision system 130.

At least one virtual function module 111 is integrated on the PLC 110, and a mapping is provided between at least one input channel of each virtual function module 111 and an output of at least one anomaly diagnosis algorithm arranged on the service provision system 130. The PLC 110 can receive measurement data of each process instrument 140, and control a corresponding process execution mechanism 150 according to the measurement data; or, when an anomaly indication fed back by the service provision system 130 via the corresponding input channel of the virtual function module 111 is received, the anomaly indication indicating that an anomaly has occurred in a particular process instrument, the corresponding process execution mechanism 150 is controlled according to the anomaly indication.

The historical database 120 stores data related to various control processes collected periodically from the PLC, including measurement data of each process instrument 140.

At least one anomaly diagnosis algorithm is arranged on the service provision system 130, each anomaly diagnosis algorithm being used to diagnose whether an anomaly exists in a process instrument. The service provision system 130 can acquire measurement data of each process instrument 140 from the historical database 120, use the corresponding anomaly diagnosis algorithm to diagnose the measurement data, and if it is determined that an anomaly has occurred in a particular process instrument, output an anomaly indication to the input channel of the corresponding virtual function module 111 of the PLC 110, as an input parameter of the PLC 110, such that the PLC 110 can control the corresponding process execution mechanism 150 according to the anomaly indication. The service provision system 130 may be arranged on a PC/server 200 or any cloud resource such as an industrial cloud 300, etc.; in this embodiment, the case where it is arranged on the industrial cloud 300 is taken as an example.

A method for integrating the virtual function module 111 on the PLC 110 may comprise: creating a virtual function module description file comprising an input channel address of the virtual function module 111 to be created, installing the virtual function module description file in a programming tool of the PLC 110, creating the virtual function module in the PLC 110 via a module catalogue provided by the programming tool, allocating the input channel address of the virtual function module on the PLC 110, and creating a virtual function module configuration file comprising a mapping between the input channel of the virtual function module 111 and an output of the service provision system 130.

The mapping between the input channel of the virtual function module 111 and the output of the anomaly diagnosis algorithm arranged on the service provision system 130 may be set by the following method: establishing a communication connection between the PLC 110 and the service provision system 130, creating a virtual function module configuration file comprising a mapping between the input channel of the virtual function module 111 and the output of the service provision system 130, and providing the virtual function module configuration file to the service provision system 130; an output variable from the service provision system 130 can then be received via the corresponding input channel of the virtual function module 111, and the output variable can be used to update a control parameter of the PLC.

Figure 2:
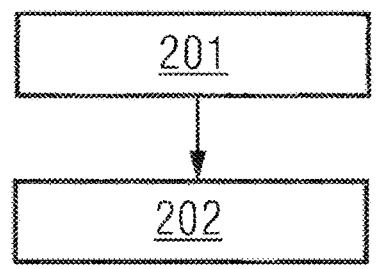
FIG. 2 is a demonstrative flow chart of the anomaly detection method for a process instrument in an embodiment of the present invention.

FIG. 2 is a demonstrative flow chart of the anomaly detection method for a process instrument in an embodiment of the present invention. The method may be applied to the PLC in FIG. 1; as shown in FIG. 2, the method may comprise the following steps:

Step 201: the PLC 110 receives measurement data of a process instrument, the measurement data being periodically stored in a historical database 120. At least one virtual function module 111 is integrated on the PLC 110, and a mapping is set between at least one input channel of each virtual function module 111 and an output of at least one anomaly diagnosis algorithm arranged on a service provision system 130, each anomaly diagnosis algorithm being used to diagnose whether an anomaly exists in a process instrument.

Step 202: upon receiving, via an input channel of the virtual function module 111, an anomaly indication outputted by the service provision system 130, the PLC 110 determines that an anomaly exists in the process instrument corresponding to the anomaly diagnosis algorithm mapped to the input channel. The anomaly indication is an indication outputted when the service provision system determines that an anomaly has occurred in the process instrument after acquiring the measurement data from the historical database 120 and using the corresponding anomaly diagnosis algorithm to diagnose the measurement data.

In this embodiment, the PLC 110 can control a process execution mechanism 150 according to measurement data of the process instrument 140 when the anomaly indication is not received; and control the process execution mechanism 150 according to a preset default datum when the anomaly indication is received.

Figure 3:
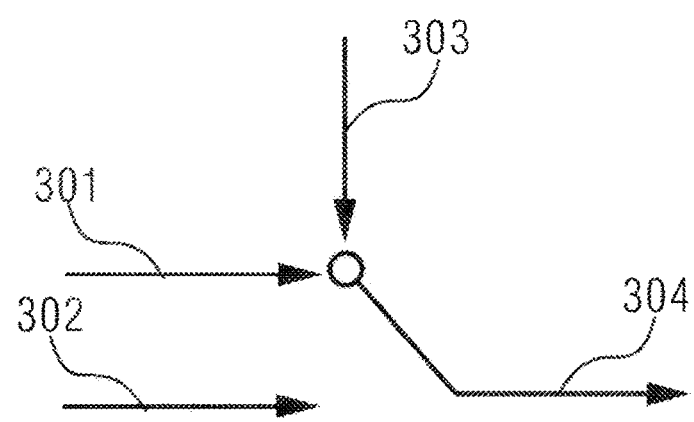
FIG. 3 is a schematic diagram of a control process of a PLC in an embodiment of the present invention.

FIG. 3 is a schematic diagram of a control process of a PLC in an embodiment of the present invention. As shown in FIG. 3, arrow 301 corresponds to measurement data of a process instrument, arrow 302 corresponds to a preset default datum, arrow 303 corresponds to an anomaly indication, and arrow 304 corresponds to a processing value used by the PLC; the process execution mechanism is controlled according to the processing value. As can be seen, when no anomaly indication is received, the processing value used by the PLC is the measurement data of the process instrument corresponding to arrow 301; when an anomaly indication is received, the processing value used by the PLC is the preset default datum corresponding to arrow 302.

Figure 4:
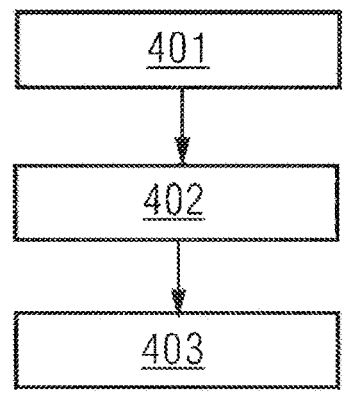
FIG. 4 is a demonstrative flow chart of the anomaly detection method for a process instrument in another embodiment of the present invention.

FIG. 4 is a demonstrative flow chart of the anomaly detection method for a process instrument in another embodiment of the present invention. The method may be applied to the service provision system in FIG. 1; as shown in FIG. 4, the method may comprise the following steps:

Step 401: the service provision system 130 acquires measurement data of a process instrument from a historical database 120; the measurement data is measurement data which is received by the PLC 110 from the process instrument and periodically stored in the historical database 120. At least one anomaly diagnosis algorithm is arranged on the service provision system 130, each anomaly diagnosis algorithm being used to diagnose whether an anomaly exists in a process instrument; a mapping is set between an output of the at least one anomaly diagnosis algorithm and at least one input channel of at least one virtual function module integrated on a PLC.

Step 402: the service provision system 130 uses the corresponding anomaly diagnosis algorithm to diagnose the measurement data, and upon diagnosing that an anomaly has occurred in the process instrument, outputs an anomaly indication to the corresponding input channel of the virtual function module 111 mapped to the anomaly diagnosis algorithm.

In this embodiment, the method may further comprise: step 403: the service provision system 130 replaces measurement data, corresponding to when an anomaly occurs in the process instrument, with a preset default datum; and stores the default datum in the historical database 120 instead of the measurement data corresponding to when an anomaly occurs in the process instrument.

Figure 5:
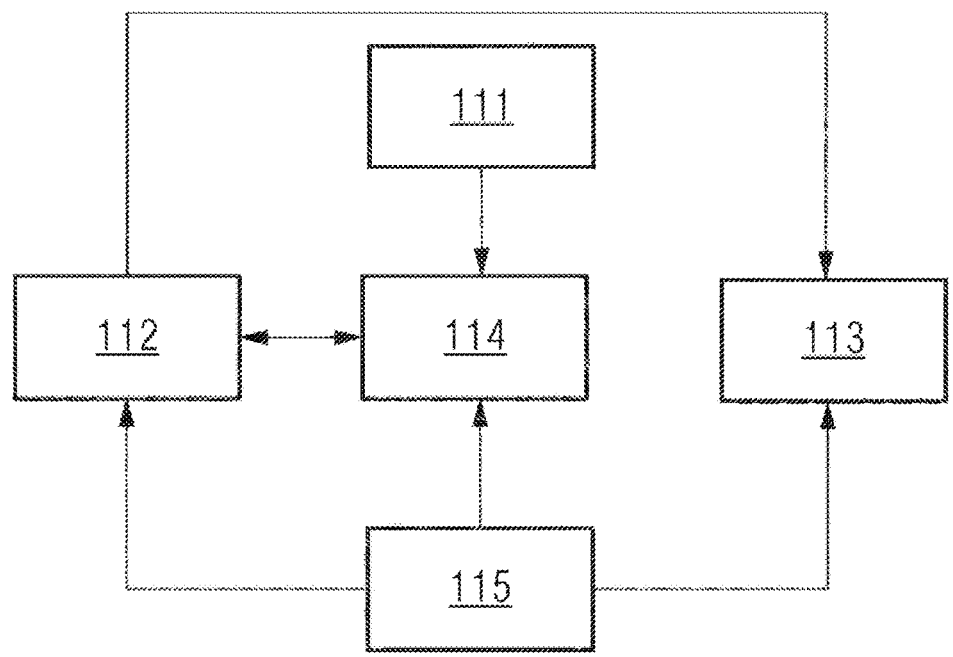
FIG. 5 is a demonstrative structural diagram of a PLC in an embodiment of the present invention.

FIG. 5 is a demonstrative structural diagram of a PLC in an embodiment of the present invention. As shown in FIG. 5, the PLC may comprise: a virtual function module 111, an analog quantity input/output module 112, a central processor module 113, a function module 114 and a power supply module 115.

A mapping is established between at least one input channel of the virtual function module 111 and an output of at least one anomaly diagnosis algorithm arranged on a service provision system 130; the virtual function module 111 is configured to, when an input channel receives an anomaly indication outputted by the service provision system 130, provide the anomaly indication to the function module 114 as an input variable of the function module 114; the input variable is used to indicate that an anomaly exists in the process instrument corresponding to the anomaly diagnosis algorithm mapped to the input channel.

The analog quantity input/output module 112 is configured to receive measurement data of a process instrument 140, convert the measurement data from an analog quantity to a digital quantity and then provide same to the function module 114; and receive a first control instruction or second control instruction from the function module 114, convert the first control instruction or second control instruction from a digital quantity to an analog quantity and then output same to a process execution mechanism 150.

The central processor module 113 is configured to cache and transfer measurement data of the process instrument 140. For example, after the analog quantity input/output module 112 has converted the measurement data from an analog quantity to a digital quantity, the measurement data can be stored in a cache, which may be internal memory of the central processor module 113, and the function module 114 can then acquire the measurement data from the cache. In addition, the measurement data of each process instrument 140 stored in the historical database 120 may be periodically read from the central processor module 113.

The function module 114 is configured to, upon receiving the input variable, determine that an anomaly exists in the corresponding process instrument, and output a first control instruction to the analog quantity input/output module 112 according to a preset default value; and otherwise output a second control instruction to the analog quantity input/output module 112 according to the measurement data.

The power supply module 115 is configured to supply power to the entire PLC, including the central processor module 113, the analog quantity input/output module 112 and the function module 114.

In this embodiment, the function module 114 may comprise a proportional-integral-derivative (PID) controller, etc.

Figure 6:
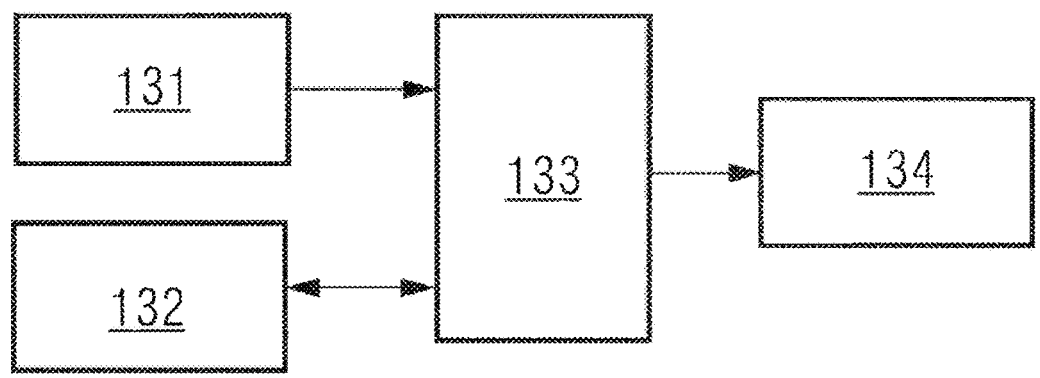
FIG. 6 is a demonstrative structural diagram of a service provision system in an embodiment of the present invention.

FIG. 6 is a demonstrative structural diagram of a service provision system 130 in an embodiment of the present invention. As shown in FIG. 6, the service provision system 130 may comprise an algorithm module 131, a first communication module 132, a data processing module 133 and a second communication module 134.

The algorithm module 131 comprises at least one anomaly diagnosis algorithm, each anomaly diagnosis algorithm being used to diagnose whether an anomaly exists in a process instrument. A mapping is established between an output of the at least one anomaly diagnosis algorithm and at least one input channel of at least one virtual function module 111 integrated on a PLC 110.

The first communication module 132 is configured to acquire measurement data of a process instrument from a historical database 120; the measurement data is measurement data which is received by the PLC 110 from the process instrument and periodically stored in the historical database 120.

The data processing module 133 is configured to call the corresponding anomaly diagnosis algorithm in the algorithm module 131 to diagnose the measurement data acquired by the first communication module 132, and output an anomaly indication to the second communication module 134 upon diagnosing that an anomaly exists in the corresponding process instrument.

The second communication module 134 is configured to output the anomaly indication to the corresponding input channel of the virtual function module 111 mapped to the anomaly diagnosis algorithm.

In one embodiment, the data processing module 133 is further configured to replace measurement data, corresponding to when an anomaly occurs in the process instrument, with a preset default datum. Correspondingly, the first communication module 132 is further configured to store the default datum in the historical database 120 instead of the measurement data corresponding to when an anomaly occurs in the process instrument.

In an embodiment of the present invention, the service provision system 130 may be arranged on a PC, a server, or any cloud resource such as an industrial cloud.

Figure 7:
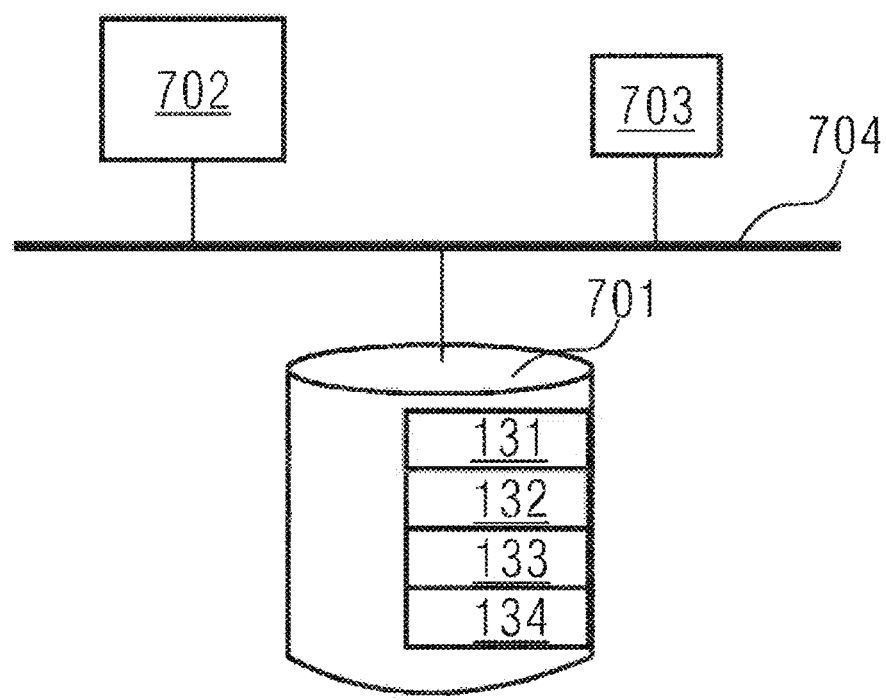
FIG. 7 is a demonstrative structural diagram of another service provision system in an embodiment of the present invention.

FIG. 7 is a demonstrative structural diagram of another service provision system 130 in an embodiment of the present invention. As shown in FIG. 7, the service provision system may comprise: at least one memory 701, at least one processor 702 and at least one port 703. These components communicate via a bus 704.

The at least one memory 701 is configured to store a computer program. The computer program may be understood to comprise the various modules shown in FIG. 6, i.e. the algorithm module 131, the first communication module 132, the data processing module 133 and a second communication module 134.

In addition, the at least one memory 701 may also store an operating system, etc. The operating system comprises but is not limited to: Android operating systems, Symbian operating systems, Windows operating systems, Linux operating systems, etc.

The at least one port 703 is configured to send and receive data.

The at least one processor 702 is configured to call a computer program stored in the at least one memory 701, in order to execute the anomaly detection method for a process instrument in an embodiment of the present invention on the basis of the function of sending and receiving data of the at least one port 703. The processor 702 may be a CPU, a processing unit/module, an ASIC, a logic module or a programmable gate array, etc.

The anomaly detection system for a process instrument in an embodiment of the present invention may comprise the abovementioned historical database 120, PLC 110 and service provision system 130.

In addition, also provided in an embodiment of the present invention is a computer-readable storage medium, having a computer program stored thereon; the computer program is executable by a processor and realizes the anomaly detection method for a process instrument in an embodiment of the present invention.

As can be seen, in the embodiments of the present invention, due to the fact that a mapping is set between the output of each anomaly diagnosis algorithm arranged on a service provision system and each input channel of at least one virtual function module integrated on the PLC, each anomaly diagnosis algorithm may be disguised as an algorithm module of the PLC itself; thus, when each anomaly diagnosis algorithm on the service provision system is used to evaluate process instrument measurement data received by the PLC and determine that an anomaly has occurred in a particular process instrument, an anomaly indication will be outputted to the corresponding input channel of the PLC, and the anomaly indication participates in PLC control directly as an input parameter of the PLC, thereby enhancing the functionality of the PLC, and realizing anomaly diagnosis for the process instrument. In addition, when it is diagnosed that an anomaly has occurred in a process instrument, by using a preset, relatively accurate default datum to replace the measurement data to perform subsequent control, it is possible to make PLC control more accurate, thereby improving PLC control accuracy.

In addition, when it is detected that an anomaly has occurred in a process instrument, the PLC uses a preset, relatively accurate default datum to replace the measurement data to perform subsequent control, such that PLC control is more accurate, and PLC control accuracy is thereby improved.

Further, by using a relatively accurate default datum to correct data in the historical database following the occurrence of an anomaly in a process instrument, it is possible to increase the accuracy of results when historical data is used to perform future analysis or statistical analysis.

The above are merely preferred embodiments of the present invention, which are not intended to limit the present invention; any amendments, equivalent substitutions or improvements, etc. which are made within the spirit and principles of the present invention should be included in the scope of protection of the present invention.

The invention claimed is:

1. An anomaly detection method for a process instrument, the anomaly detection method comprising:
receiving, via a programmable logic controller (PLC), measurement data of a process instrument, at least one virtual function module being integrated on the PLC;
periodically storing the measurement data in a historical database;
setting a mapping between at least one input channel of each at least one virtual function module and an output of at least one anomaly diagnosis algorithm arranged on a service provision system, each at least one anomaly diagnosis algorithm being programmed to diagnose whether an anomaly exists in the process instrument;
determining via the PLC, upon receiving an anomaly indication output by the service provision system via the at least one input channel of the at least one virtual function module, whether or not an anomaly exists in the process instrument corresponding to the at least one anomaly diagnosis algorithm mapped to the at least one input channel, wherein the anomaly indication is output by the service provision system upon the service provision system determining that an anomaly exists in the process instrument, after acquiring the measurement data from the historical database, and using the corresponding at least one anomaly diagnosis algorithm to diagnose the measurement data, each of the at least one anomaly diagnosis algorithm being disguised as an algorithm module of the PLC such that the anomaly indication is an input to a corresponding channel of the PLC and the anomaly indication participates in PLC control directly as an input parameter of the PLC;
controlling, via the PLC, a process execution mechanism according to the measurement data upon the PLC not receiving the anomaly indication; and
controlling the process execution mechanism according to a default datum upon the PLC receiving the anomaly indication, the default datum replacing the measurement data for the controlling of the process execution mechanism according to the default datum.

2. A programmable logic controller (PLC), comprising:
a function module;
a virtual function module, wherein
a mapping is set between at least one input channel of the virtual function module and an output of at least one anomaly diagnosis algorithm arranged on a service provision system, and
upon the at least one input channel receiving an anomaly indication output by the service provision system, the virtual function module being configured to provide the anomaly indication to the function module as an input variable of the function module, the input variable indicating an anomaly exists in a process instrument corresponding to the at least one anomaly diagnosis algorithm mapped to the input channel, each of the at least one anomaly diagnostics algorithm being disguised as an algorithm module of the PLC such that the anomaly indication is an input to a corresponding input channel of the PLC and the anomaly indication participates in PLC control directly as an input parameter of the PLC;
an analog quantity input/output module configured to
receive measurement data of the process instrument, convert the measurement data from an analog quantity to a digital quantity, and provide the measurement data, converted from the analog quantity to the digital quantity, to the function module, and
receive, from the function module, a first control instruction or second control instruction to control a process execution mechanism, convert the first control instruction or the second control instruction from a digital quantity to an analog quantity, and output the first control instruction or the second control instruction, converted from the digital quantity to the analog quantity, to the process execution mechanism;
a central processor module configured to cache and transfer the measurement data, wherein
the function module, upon receiving the input variable, is configured to
determine whether or not the anomaly exists in the corresponding process instrument, and
output the first control instruction to the analog quantity input/output module according to a default datum upon determining that the anomaly exists, the default datum replacing the measurement data for the control of the process execution mechanism, and
output the second control instruction to the analog quantity input/output module according to the measurement data, upon determining that the anomaly does not exist; and
a power supply module configured to supply power to the central processor module, the analog quantity input/output module and the function module.

3. A service provision system, comprising:
at least one memory to store a computer program; and
at least one processor to call the computer program stored in the at least one memory, and to execute an anomaly detection method of claim 1.

4. A non-transitory computer-readable storage medium, storing a computer program, the computer program being executable by a processor and being configured to realize the anomaly detection method of claim 1 upon being executed by the processor.

5. A service provision system, comprising:
at least one memory storing
a computer program, and
a mapping between an output of at least one anomaly diagnosis algorithm arranged on the service provision system and at least one input channel of each at least one virtual function module integrated on a programmable logic controller (PLC), each at least one anomaly diagnosis algorithm being programmed to diagnose whether an anomaly exists in a process instrument; and
at least one processor configured to
call the computer program stored in the at least one memory,
execute at least sending of measurement data of the process instrument to at least one virtual function module integrated on the PLC,
periodically receive the measurement data, and
store the measurement data in a historical database; and
the PLC configured to
determine, upon receiving an anomaly indication output by the service provision system, via at least one input channel of the at least one virtual function module, whether or not an anomaly exists in the process instrument corresponding to the at least one anomaly diagnosis algorithm respectively mapped to the at least one input channel, output the anomaly indication upon the PLC determining that an anomaly exists in the process instrument, after acquiring the measurement data from the historical database and using the corresponding at least one anomaly diagnosis algorithm to diagnose the measurement data, each of the at least one anomaly diagnose algorithm being disguised as an algorithm module of the PLC such that the anomaly indication is an input to a corresponding channel of the PLC and the anomaly indication participates in PLC control directly as an input parameter of the PLC, control a process execution mechanism according to the measurement data upon the PLC not receiving the anomaly indication, and control the process execution mechanism according to a default datum upon the PLC receiving the anomaly indication, the default datum replacing the measurement data for the control of the process execution mechanism according to the default datum.

* * * * *